United States Patent
Larsson et al.

(10) Patent No.: US 9,398,565 B2
(45) Date of Patent: Jul. 19, 2016

(54) METHODS PROVIDING OFFSET VALUES DEFINING DIFFERENCES BETWEEN MIMO DATA STREAMS AND RELATED CONTROLLERS AND WIRELESS TERMINALS

(71) Applicant: TELEFONAKTIEBOLAGET L M ERICSSON (PUBL), Stockholm (SE)

(72) Inventors: Erik Larsson, Uppsala (SE); Cagatay Konuskan, Stockholm (SE); Peter von Wrycza, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 329 days.

(21) Appl. No.: 14/116,332

(22) PCT Filed: Aug. 1, 2013

(86) PCT No.: PCT/SE2013/050944
§ 371 (c)(1),
(2) Date: Nov. 7, 2013

(87) PCT Pub. No.: WO2014/021774
PCT Pub. Date: Feb. 6, 2014

(65) Prior Publication Data
US 2014/0334459 A1    Nov. 13, 2014

Related U.S. Application Data

(60) Provisional application No. 61/679,565, filed on Aug. 3, 2012.

(51) Int. Cl.
*H04W 72/04* (2009.01)
*H04B 7/06* (2006.01)
(Continued)

(52) U.S. Cl.
CPC ............ *H04W 72/04* (2013.01); *H04B 7/0413* (2013.01); *H04B 7/0491* (2013.01); *H04B 7/06* (2013.01); *H04W 36/18* (2013.01)

(58) Field of Classification Search
None
See application file for complete search history.

(56) References Cited

U.S. PATENT DOCUMENTS

2010/0296591 A1    11/2010   Xu et al.
2010/0298021 A1*   11/2010   Bergman ............ H04W 52/146
                                                       455/522

(Continued)

OTHER PUBLICATIONS

Ericsson, ST-Ericsson, "Initial considerations on the design for UL MIMO for HSUPA", 3GPP TSG RAN WG1 Meeting #63bis, R1-110496, Dublin, Ireland, Jan. 17-21, 2011, 16 Pages.

(Continued)

*Primary Examiner* — Redentor Pasia
(74) *Attorney, Agent, or Firm* — Patent Portfolio Builders, PLLC

(57) ABSTRACT

A method of communicating with a wireless terminal may include providing first information responsive to receiving first and second multiple-input-multiple-output (MIMO) data streams from the wireless terminal through a first antenna array of a first sector during a first transmission time interval. Second information may be provided responsive to receiving the first and second MIMO data streams from the wireless terminal through a second antenna array of a second sector during the first transmission time interval with the first and second sectors being different and the first and second antenna arrays being different. An offset value may be generated responsive to the first information and/or the second information, with the offset value defining a difference between the first and second MIMO data streams for a second transmission time interval, and the offset value may be transmitted to the wireless terminal.

19 Claims, 7 Drawing Sheets

(51) Int. Cl.
*H04W 36/18* (2009.01)
*H04B 7/04* (2006.01)

(56) References Cited

U.S. PATENT DOCUMENTS

| | | |
|---|---|---|
| 2011/0158305 A1 | 6/2011 | Goransson |
| 2011/0194504 A1* | 8/2011 | Gorokhov ............ H04B 7/0417 370/329 |
| 2011/0243007 A1 | 10/2011 | Xiao |
| 2011/0263281 A1* | 10/2011 | Cai ...................... H04B 7/0404 455/501 |
| 2012/0177089 A1 | 7/2012 | Pelletier et al. |
| 2012/0287965 A1* | 11/2012 | Sambhwani ......... H04B 7/0413 375/141 |
| 2012/0300827 A1* | 11/2012 | Chung ................. H04W 24/10 375/227 |

OTHER PUBLICATIONS

Ericsson, ST-Ericsson, "On Grant and E-TFC Selection for Uplink MIMO with 64QAM", 3GPP TSG-RAN WG1 #68bis, R1-121768, Jeju, South Korea, Mar. 26-30, 2012, 6 Pages.

Huawei, HiSilicon, "Initial link-level simulation results for UL MIMO", 3GPP TSG-RAN WG1 Meeting #66, R1-112208, Athens, Greece, Aug. 22-26, 2011, 6 Pages.

International Search Report and Written Opinion Corresponding to International Application No. PCT/SE2013/050944; Date of Mailing: Jan. 30, 2014; 24 Pages.

Ericsson et al. "On Grant and E-TFC Selection for Uplink MIMO with 64QAM", 3GPP TSG-RAN WG1 #68bis, R1-121768, Jeju, South Korea, Mar. 26-30, 2012, 6 Pages.

Invitation to Pay Additional Fees Corresponding to International Application No. PCT/SE2013/050944; Date of Mailing: Nov. 26, 2013; 7 Pages.

Telatar "Capacity of Multi-Antenna Gaussian Channels" (European Transactions on Telecommunications, vol. 10, pp. 585-595, Nov. 1999).

3GPP TR 25.871 V11.0.0 (Sep. 2011) $3^{rd}$ Generation Partnership Project; Technical Specification Group Radio Access Network; Uplink Multiple Input Multiple Output (MIMO) for High Speed Packet Access (HSPA); (Release 11) 42 pages.

Nokia Siemens Networks "MIMO with 64QAM for HSUPA" 3GPP TSG RAN Meeting #54 Berlin, Germany, Dec. 6-9, 2011; RP-111642; 3 versions, 15 pages.

* cited by examiner

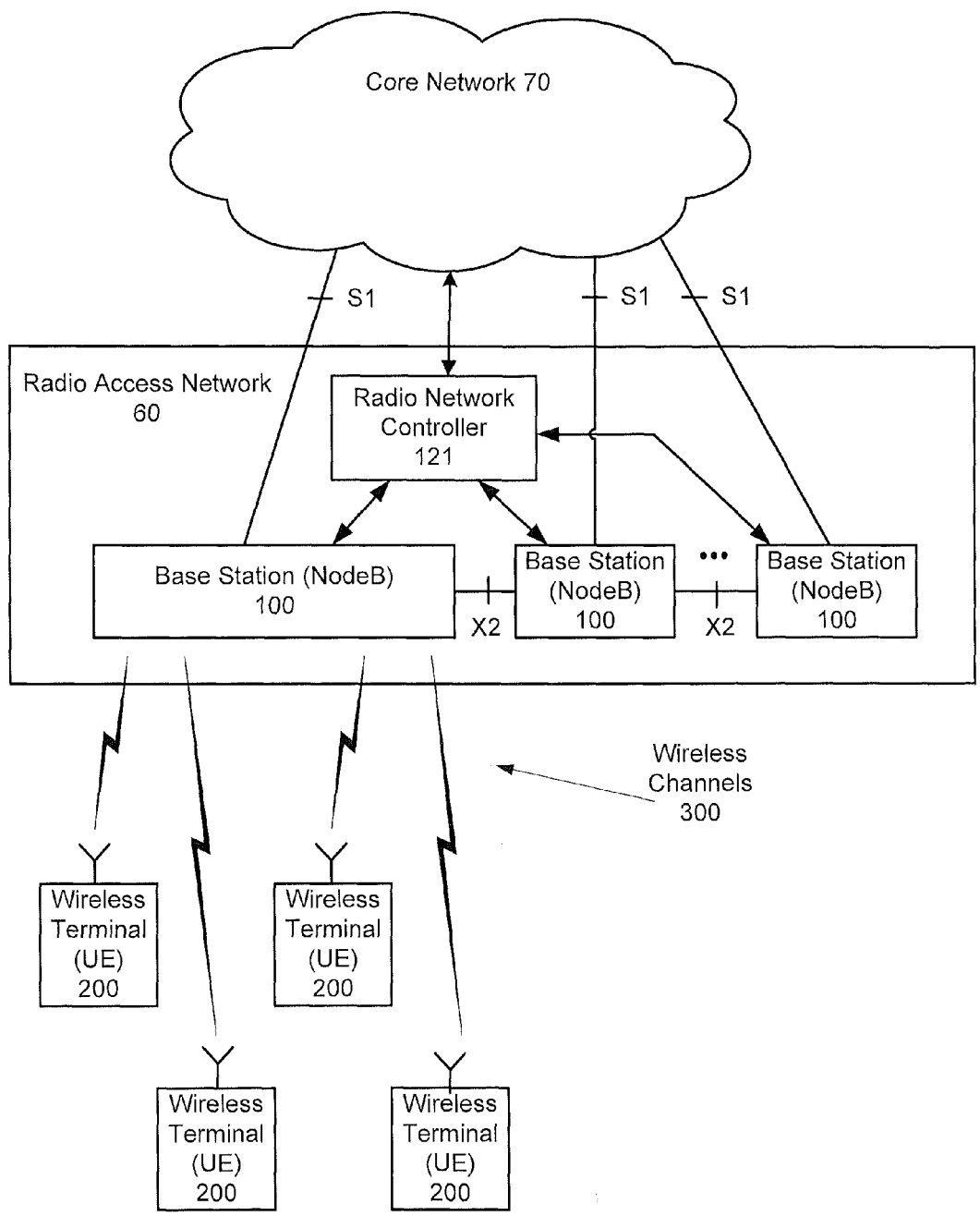

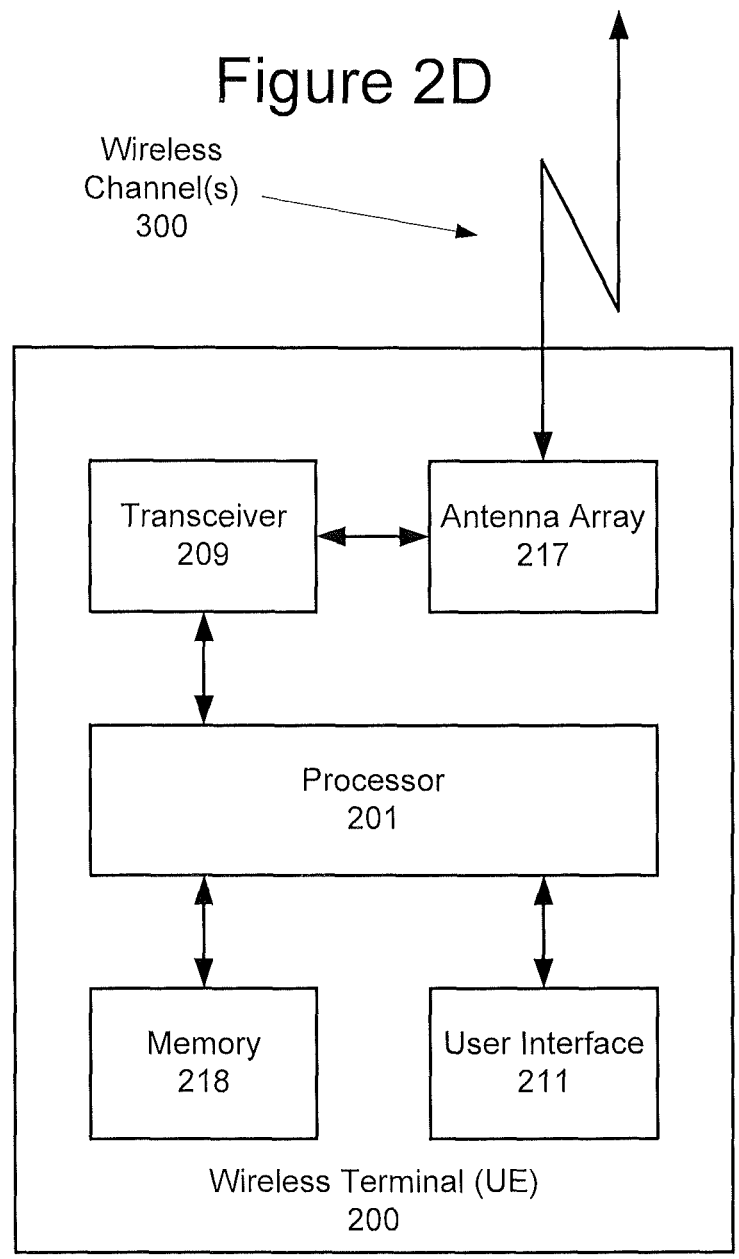

METHODS PROVIDING OFFSET VALUES DEFINING DIFFERENCES BETWEEN MIMO DATA STREAMS AND RELATED CONTROLLERS AND WIRELESS TERMINALS

RELATED APPLICATION

This application is a 35 U.S.C. §371 national stage application of PCT International Application No. PCT/SE2013/050944, filed in English on 1 Aug. 2013, which itself claims the benefit of priority from U.S. Provisional Application No. 61/679,565 entitled "Secondary Transport Block Size (TBS) Offset Adjustment In Soft/Softer Handover (SHO)" filed Aug. 3, 2012, the disclosures of which are hereby incorporated herein in their entireties by reference.

TECHNICAL FIELD

The present disclosure is directed to communications and, more particularly, to wireless communications and related network nodes and wireless terminals.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Moreover, a cell area for a base station may be divided into a plurality of sectors (also referred to as cells) surrounding the base station. For example, a base station may service three 120 degree sectors/cells surrounding the base station, and the base station may provide a respective directional transceiver and sector antenna array for each sector. Stated in other words, a base station may include three directional sector antenna arrays servicing respective 120 degree base station sectors surrounding the base station.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver for a base station sector are equipped with multiple antennas (e.g., an sector antenna array) to provide a multiple-input multiple-output (MIMO) communication channel(s) for the base station sector. Such systems and/or related techniques are commonly referred to as MIMO (Multiple-Input-Multiple-Output). The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink (DL) from a base station transmitting from a sector antenna array over a MIMO channel to a wireless terminal in the sector, for example, spatial multiplexing (or SM) may allow the simultaneous transmission of multiple symbol streams over the same frequency from the base station sector antenna array for the sector. Stated in other words, multiple symbol streams may be transmitted from the base station sector antenna array for the sector to the wireless terminal over the same downlink time/frequency resource element (TFRE) to provide an increased data rate. In a downlink from the same base station sector transmitting from the same sector antenna array to the same wireless terminal, transmit diversity (e.g., using space-time codes) may allow the simultaneous transmission of the same symbol stream over the same frequency from different antennas of the base station sector antenna array. Stated in other words, the same symbol stream may be transmitted from different antennas of the base station sector antenna array to the wireless terminal over the same time/frequency resource element (TFRE) to provide increased reliability of reception at the wireless terminal due to transmit diversity gain.

To further increase throughput at a sector/cell edge (also referred to as a soft handover area or border area) using High Speed Downlink Packet Access (HSDPA), Multi-Flow-HSDPA (MF-HSDPA, also referred to as Multi-Flow-HSDPA or MP-HSDPA) has been proposed for $3^{rd}$ Generation Partnership Project (3GPP) communications. In MF-HSDPA, transport data blocks of a data stream may be transmitted from two different sectors/cells of the same or different base stations to a same wireless terminal in a border area between the sectors/cells. Intra NodeB aggregation (also referred to as intra node Multi-Flow communications) occurs when different transport data blocks of a data stream are transmitted from two different sectors of a same base station to a wireless terminal, and Inter NodeB aggregation (also referred to as inter node Multi-Flow communications) occurs when different transport data blocks of a data stream are transmitted from sectors/cells of different base stations to a wireless terminal. MF-HSDPA may thus provide advantages of parallel data streams like MIMO where the spatially separated antennas are taken from different sectors/cells.

In the opposite direction, uplink transmissions from the UE may be transmitted to two different sectors/cells of the same or different base stations when located in a soft handover area (or border area) between the sectors/cells. At 3GPP ($3^{rd}$ Generation Partnership Project) RAN (Radio Access Network) #54 plenary meeting, a work item (WI) on MIMO with 64-QAM (Quadrature Amplitude Modulation) for HSUPA was initiated. See, 3GPP TSG RAN Meeting #54 RP-111642, "MIMO With 64QAM for HSUPA", Berlin, Germany, Dec. 6-9, 2011, the disclosure of which is hereby incorporated herein in its entirety by reference. The WI initialization was a result of studies regarding potential benefits and solutions performed during the study item (SI) phase. For a summary of the findings, see, 3GPP TR 25.871, V11.0.0, "Uplink Multiple Input Multiple Output (MIMO) for High Speed Packet Access (HSPA)," Release 11, 2011-09, the disclosure of which is hereby incorporated herein in its entirety by reference.

For uplink MIMO transmissions to multiple sectors/cells during soft/softer handover, the radio access network may use a serving grant (essentially a power measure) to control the interference that a UE is allowed to create. The serving grant thus gives an "upper bound" on how much data the UE may transmit. For dual stream (rank 2) uplink MIMO transmissions, a transport format combination for the primary stream may be essentially controlled by the serving grant, while a transport format combination for the secondary stream may be essentially controlled by a combination of the serving grant and an offset value that may be determined by the serving base station (nodeB). If the multiple sectors/cells for the SHO communications are at different base stations (nodeBs), however, the serving grant and/or offset value may not adequately reflect different channel characteristics between the UE and the different sectors/cells.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Embodiments presented hereinafter may provide methods, network nodes, and/or mobile terminals to address at least some of the above mentioned and/or other problems.

According to some embodiments, a method of communicating with a wireless terminal may include providing first information responsive to receiving first and second multiple-input-multiple-output (MIMO) data streams from the wireless terminal through a first antenna array of a first sector during a first transmission time interval. Second information may be provided responsive to receiving the first and second MIMO data streams from the wireless terminal through a second antenna array of a second sector during the first transmission time interval, with the first and second sectors being different and the first and second antenna arrays being different. An offset value may be provided responsive to the first information and/or the second information, with the offset value defining a difference between the first and second MIMO data streams for a second transmission time interval, and the offset value may be transmitted to the wireless terminal.

By considering information from first and second antenna arrays to generate the offset value, for example, performance of MIMO uplink communications may be improved in soft/softer handover situations. For example, MIMO uplink communications may be better adapted to the channel conditions between the wireless terminal and each of the different antenna arrays.

The offset value may define a difference between data rates of the first and second MIMO data streams for the second transmission time interval. In addition, a grant may be generated defining a first transport block size of the first MIMO data stream for the second transmission time interval, with the offset value defining a reduction of a second transport block size of the second MIMO data stream relative to the first transport block size for the second transmission time interval, and the grant defining the first transport block size may be transmitted to the wireless terminal. Moreover, the grant may include a transport format combination for the first MIMO data stream.

Transmitting the offset value may include transmitting the offset value using a layer 1 signaling channel.

The first information may include a first quality of service (QoS) measure, and the second information may include a second QoS measure.

For example, each of the first and second QoS measures may include at least one of an error rate, a block error rate, a signal strength, a signal-to-interference ratio (SIR), and/or a signal-to-interference-plus-noise ratio (SINR).

Generating the offset value may include generating the offset value responsive to a combination of the first information and the second information. For example, generating the offset value responsive to a combination of the first information and the second information may include generating the offset value responsive to an average of the first information and the second information, responsive to a sum of the first information and the second information, responsive to a weighted average of the first information and the second information, and/or responsive to a weighted sum of the first information and the second information.

Generating the offset value may further include selecting one of the first information or the second information corresponding to a least error rate, a greatest error rate, a least throughput, a greatest throughput, a least interference, a greatest interference, a least signal strength, or a greatest signal strength, and generating the offset value may further include generating the offset value responsive to the selected one of the first information or the second information.

Generating the offset value may include generating a first offset value responsive to the first information and generating a second offset value responsive to the second information, wherein the first offset value defines a first difference between data rates of the first and second MIMO data streams for the second transmission time interval after the first transmission time interval, wherein the second offset value defines a second difference between data rates of the first and second MIMO data streams for the second transmission time interval, and wherein transmitting the offset value comprises transmitting the first and second offset values to the wireless terminal. Moreover, a grant may be generated defining a first transport block size of the first MIMO data stream for the second transmission time interval, wherein the first and second offset values define respective first and second reductions of a second transport block size of the second MIMO data stream relative to the first transport block size for the second transmission time interval, and the grant defining the first transport block size may be transmitted to the wireless terminal.

The first and second antenna arrays may be co-located as first and second antenna arrays of a radio base station.

The first and second antenna arrays may be spaced apart at respective spaced apart first and second radio base stations.

Generating the offset value may include generating the offset value responsive to the first information and the second information.

According to some other embodiments, a radio network controller of a radio access network may include a network interface configured to provide communications with first and second base stations including respective first and second antenna arrays of respective first and second sectors, and a processor coupled with the network interface. The processor may be configured to provide first information responsive to receiving first and second multiple-input-multiple-output (MIMO) data streams from a wireless terminal through the first antenna array of the first sector during a first transmission time interval, and to provide second information responsive to receiving the first and second MIMO data streams from the wireless terminal through the second antenna array of the second sector during the first transmission time interval. The processor may be further configured to generate an offset value responsive to the first information and/or the second information, with the offset value defining a difference between the first and second MIMO data streams for a second transmission time interval, and to transmit the offset value through the network interface to the wireless terminal.

The offset value may define a difference between data rates of the first and second MIMO data streams for the second transmission time interval. In addition, the processor may be further configured to generate a grant defining a first transport block size of the first MIMO data stream for the second transmission time interval, with the offset value defining a reduction of a second transport block size of the second MIMO data stream relative to the first transport block size for the second transmission time interval, and to transmit the grant defining the first transport block size through the network interface to the wireless terminal. Moreover, the grant may include a transport format combination for the first MIMO data stream.

The processor may be configured to transmit the offset value using a layer 1 signaling channel.

The first information may include a first quality of service (QoS) measure, and the second information may include a second QoS measure.

The processor may be further configured to generate the offset value responsive to the first information and the second information.

According to still other embodiments, a method of operating a wireless terminal in communication with a radio access network may include transmitting first and second multiple-input-multiple-output (MIMO) data streams from the wireless terminal to the radio access network during a first transmission time interval. A first preliminary offset value may be received defining a first difference between the first and second MIMO data streams, and a second preliminary offset value may be received defining a second difference between the first and second MIMO data streams. A final offset value may be generated responsive to the first and second preliminary offset values with the final offset value defining a difference between the first and second MIMO data streams for a second transmission time interval after the first transmission time interval. The first and second MIMO data streams may be transmitted from the wireless terminal to the radio access network during the second transmission time interval using the final offset value to define the difference between the first and second MIMO data streams.

The first preliminary offset value may defines a first difference between data rates of the first and second MIMO data streams, the second preliminary offset value may define a second difference between data rates of the first and second MIMO data streams, and the final offset value may define a difference between data rates of the first and second MIMO data streams.

A grant may be received defining a first transport block size of the first MIMO data stream for the second transmission time interval, with the final offset value defining a reduction of a second transport block size of the second MIMO data stream relative to the first transport block size for the second transmission time interval, and transmitting the first and second MIMO data streams during the second transmission time interval may include transmitting the first MIMO data stream in accordance with first transport block size and transmitting the second MIMO data stream in accordance with the final offset value. The grant may include a transport format combination for the first MIMO data stream.

Receiving the first preliminary offset value may include receiving the first preliminary offset value over a first signaling channel between the wireless terminal and a first antenna array of a first sector, and receiving the second preliminary offset value may include receiving the second preliminary offset value over a second signaling channel between the wireless terminal and a second antenna array of a second sector.

Generating the final offset value may include generating the final offset value responsive to a combination of the first preliminary offset value and the second preliminary offset value. For example, generating the final offset value may include generating the final offset value responsive to an average of the first and second preliminary offset values, responsive to a sum of the first and second preliminary offset values, responsive to a weighted average of the first and second preliminary offset values, and/or responsive to a weighted sum of the first and second preliminary offset values.

Generating the final offset value may further include selecting one of the first and second preliminary offset values corresponding to a least error rate, a greatest error rate, a least throughput, a greatest throughput, a least interference, a greatest interference, a least signal strength, and/or a greatest signal strength.

According to some other embodiments, a wireless terminal may include a transceiver configured to provide communications with a radio access network over a wireless channel, and a processor coupled to the transceiver. The processor may be configured to transmit first and second multiple-input-multiple-output (MIMO) data streams through the transceiver to the radio access network during a first transmission time interval. The processor may also be configured to receive a first preliminary offset value defining a first difference between the first and second MIMO data streams, and to receive a second preliminary offset value defining a second difference between the first and second MIMO data streams. The processor may be further configured to generate a final offset value responsive to the first and second preliminary offset values with the final offset value defining a difference between the first and second MIMO data streams for a second transmission time interval after the first transmission time interval, and to transmit the first and second MIMO data streams through the transceiver to the radio access network during the second transmission time interval using the final offset value to define the difference between the first and second MIMO data streams.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 1 is a block diagram of a communication system that is configured according to some embodiments;

FIGS. 2A, 2B, 2C, and 2D are block diagrams respectively illustrating a base station, a base station controller, a radio network controller, and a wireless terminal according to some embodiments of FIG. 1;

DETAILED DESCRIPTION

Figure 2A:
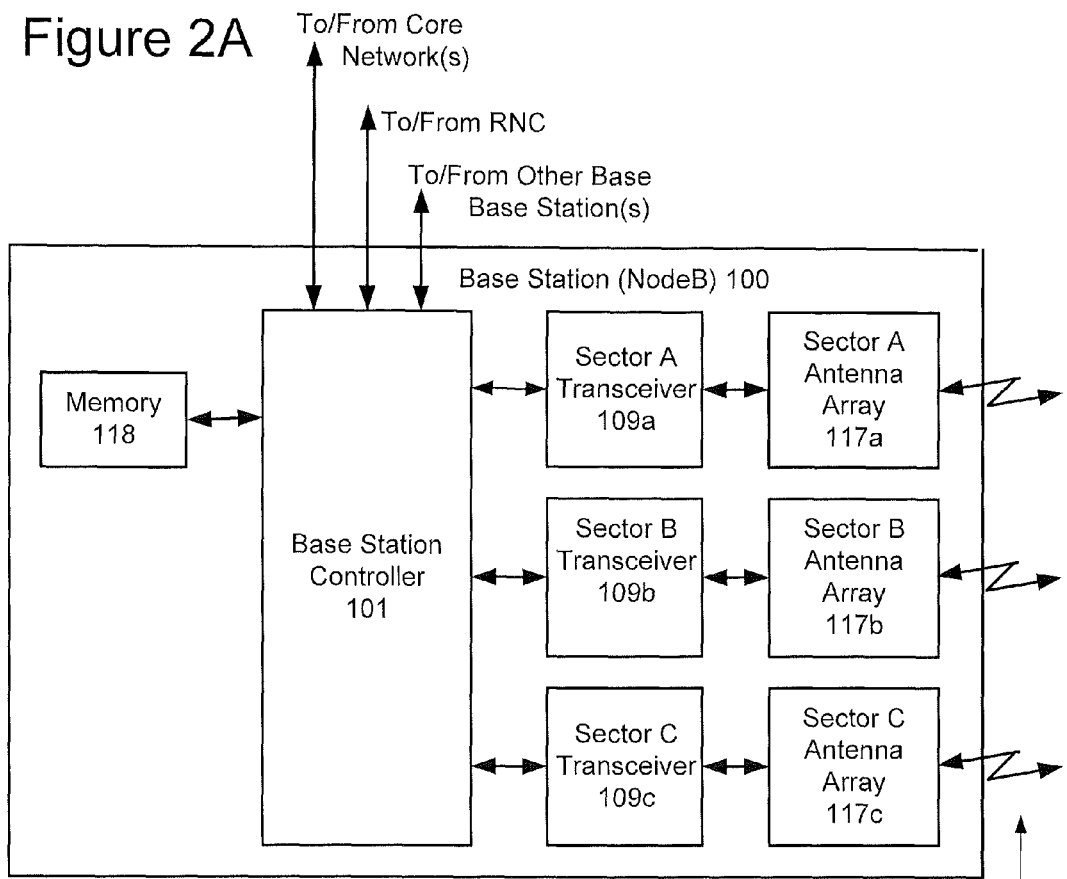

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a RAN that communicates over radio communication channels with wireless terminals (also referred to as UEs). It will be understood, however, that present inventive concepts are not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the NodeB's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from HSUPA (High Speed Uplink Packet Access) and/or WCDMA (Wideband Code Division Multiple Access) is used in this disclosure to exemplify embodiments of inventive concepts, this should not be seen as limiting the scope of inventive concepts to only these systems. Other wireless systems, including WiMax (Worldwide Interoperability for Microwave Access), UMB (Ultra Mobile Broadband),
3GPP (3$^{rd}$ Generation Partnership Project) LTE (Long Term Evolution), GSM (Global System for Mobile Communications), etc., may also benefit from exploiting embodiments of present inventive concepts disclosed herein.

Also note that terminology such as base station (e.g., a NodeB and/or eNodeB) and wireless terminal (also referred to as UE or User Equipment node) should be considered non-limiting and does not imply a certain hierarchical relation between the two. In general a base station (e.g., a NodeB and/or eNodeB) and a wireless terminal (e.g., a "UE") may be considered as examples of respective different communications devices that communicate with each other over a wireless radio channel. While embodiments discussed herein may focus on wireless transmissions in an uplink from a UE to an NodeB/eNodeB, embodiments of inventive concepts may also be applied, for example, in the downlink.

FIG. 1 is a block diagram of a communication system that is configured to operate according to some embodiments of present inventive concepts. An example RAN 60 is shown that may be an HSPA and/or Long Term Evolution (LTE) RAN. Radio base stations (e.g., NodeBs and/or eNodeBs) 100 may be connected directly to one or more core networks 70, and/or radio base stations 100 may be coupled to core networks 70 through one or more radio network controllers (RNC) 121. In some embodiments, functions of radio network controller (RNC) 100 may be performed by radio base stations 100. Radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

FIG. 2A is a block diagram of a base station 100 of FIG. 1 configured to provide service over three 120 degree sectors (sectors A, B, and C) surrounding the base station according to some embodiments. As shown, for example, base station 100 may include three transceivers 109a, 109b, and 109c coupled between base station controller 101 and respective sector antenna arrays 117a, 117b, and 117c (each of which may include multiple MIMO antennas), and memory 118 coupled to processor 101.

More particularly, each transceiver 109 may include a receiver and a transmitter. Each receiver may be configured to generate digital data streams corresponding to one or more transport data blocks received through the respective sector antenna array 117 from wireless terminals 200 located in a sector serviced by the respective sector antenna array. Each transmitter may be configured to transmit one or more transport data blocks through the respective sector antenna array 117 to wireless terminals 200 located in the sector serviced by the sector antenna array responsive to a digital data stream from processor 101. Accordingly, base station 100 of FIG. 1 may define three 120 degree sectors A, B, and C surrounding the base station, transceiver 109a and sector antenna array 117a may support MIMO uplink/downlink communications for wireless terminals 200 in sector A of base station 100, transceiver 109b and sector antenna array 117b may support MIMO uplink/downlink communications for wireless terminals 200 in sector B of base station 100, and transceiver 109c and sector antenna array 117c may support MIMO uplink/downlink communications for wireless terminals 200 in sector C of base station 100.

Figure 2B:
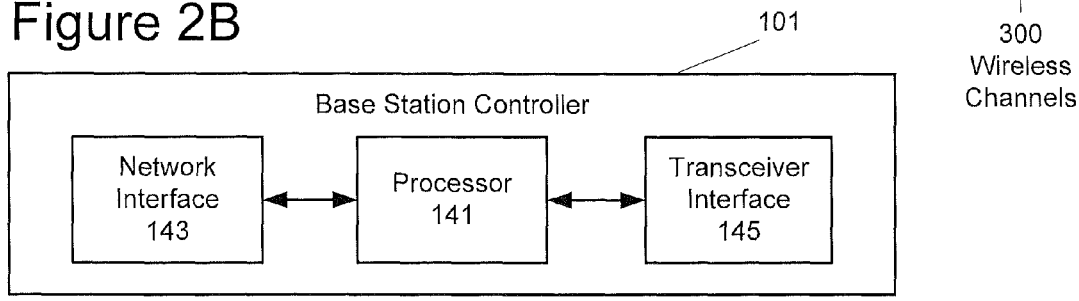

FIG. 2B is a block diagram of base station controller 101 of FIG. 2A according to some embodiments. As shown, for example, base station controller 101 may include processor 141, network interface 143, and transceiver interface 145. Network interface 143 may provide a communications interface between processor 141 and core network 70, between processor 141 and RNC 121, and/or between processor 141 and other base stations 100. Transceiver interface 145 may be configured to provide a communications interface between processor 141 and each of transceivers 109a, 109b, and 109c.

Figure 2C:
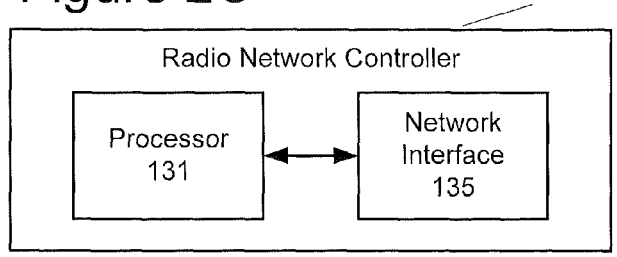

FIG. 2C is a block diagram of radio network controller (RNC) 121 of FIG. 1 according to some embodiments. As shown, for example, RCN 121 may include processor 131 and network interface 135. Network interface 143 may provide a communications interface between processor 131 and base stations 100 and/or between processor 131 and core network 70.

FIG. 2D is a block diagram of a wireless terminal (UE) 200 of FIG. 1 according to some embodiments. Wireless terminal 200, for example, may be a cellular radiotelephone, a smart phone, a laptop/netbook/tablet/handheld computer, or any other device providing wireless communications. Wireless terminal 200, for example, may include processor 201, user interface 211 (e.g., including a visual display such as an liquid crystal display, a touch sensitive visual display, a keypad, a speaker, a microphone, etc.), memory 218, transceiver 209, and sector antenna array 217 (including a plurality of antenna elements). Moreover, transceiver 209 may include a receiver allowing processor 201 to receive data from radio access network 60 over one or more wireless channels 300 through sector antenna array 217 and transceiver 209, and transceiver 209 may include a transmitter allowing processor 201 to transmit data through transceiver 209 and sector antenna array 217 over one or more wireless channels 300 to radio access network 60.

By providing a plurality of antenna elements in sector antenna array 217, wireless terminal 200 may transmit MIMO uplink communications allowing spatial multiplexing and/or diversity gain as discussed above. A maximum number of uplink MIMO channels that may be transmitted simultaneously by wireless terminal 200 when communicating through a single sector/cell or through multiple sectors/cells (when located in a soft/softer handover area), however, may be equal to a lesser of the number of antenna elements included in antenna array 217 or the number of antenna elements included in the respective sector antenna array(s) 117. According to some embodiments of present inventive concepts, wireless terminal antenna array 217 may include two antenna elements, and wireless terminal 200 may be limited to transmitting no more that 2 MIMO uplink streams simultaneously. During single cell MIMO communications (when wireless terminal is communicating through only one sector/cell) with wireless terminal antenna array 217 including 2 antenna elements, wireless terminal 200 may transmit up to two MIMO uplink data streams simultaneously to a same sector/cell antenna array of RAN 60. During multi-cell MIMO communications (when wireless terminal 200 is located in a soft/softer handover area and communicates through multiple sectors/cells) with wireless terminal antenna array 217 including 2 antenna elements, wireless terminal 200 may transmit first and second MIMO uplink data streams to multiple sectors/cells of a same base station or of different base stations. During such multi-cell MIMO communications, each sector/cell may receive both uplink data streams thereby allowing the radio access network to improve uplink reception using diversity reception techniques.

For multi-cell rank-2 uplink transmissions received by different sectors/cells of a same base station, base station controller 101 (or processor 141 thereof) may combine the components of the different uplink data streams received through the different sectors/cells to reproduce the first and second uplink data streams, and base station controller 101 (or processor 141 thereof) may then combine the first and second uplink data streams into a combined data stream from wireless terminal 200. Base station controller 101 may then transmit the combined data stream through the radio network controller 121 to core network 70.

For multi-cell rank-2 uplink transmissions received by different sectors/cells of different base stations, each base station may transmit components of the first and second data streams to radio network controller 121. Radio network controller 121 (or processor 131 thereof) may then combine the components of the different uplink data streams received through the different sectors/cells to reproduce the first and second uplink data streams, and radio network controller 121 (or processor 131 thereof) may then combine the first and second uplink data streams into a combined data stream from wireless terminal 200. Radio network controller 121 may then transmit the combined data stream to core network 70.

Figure 3A:
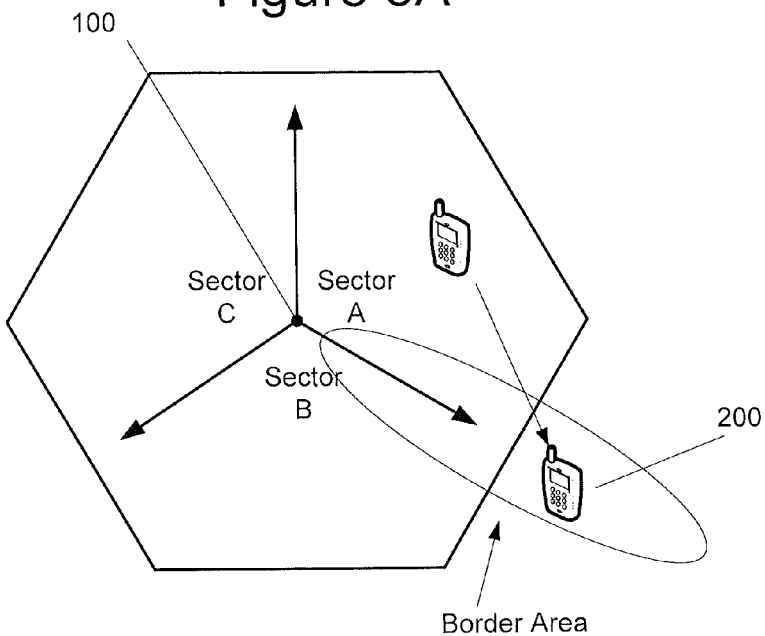
FIGS. 3A and 3B are schematic diagrams respectively illustrating intra node and inter node communications according to some embodiments.

As shown in FIG. 3A, base station 100 of FIG. 2A may support communications with wireless terminals in three different 120 degree sectors A, B, and C. More particularly, transceiver 109a and sector antenna array 117a may support MIMO communications with wireless terminals located in Sector A, transceiver 109b and sector antenna array 117b may support MIMO communications with wireless terminals located in Sector B, and transceiver 109c and sector antenna array 117c may support MIMO communications with wireless terminals located in Sector C. Stated in other words, each of sector antenna arrays 117a, 117b, and 117c (together with respective transceivers 109a, 109b, and 109c) defines a respective 120 degree sector A, B, and C. When wireless terminal 200 is initially located in a central portion of sector A as shown in FIG. 3A, wireless terminal 200 may transmit MIMO uplink communications that are received through sector antenna array 117a and transceiver 109a at base station 100.

When wireless terminal 200 moves from a central portion of sector A to a softer handover area (also referred to as a border area) between sectors A and B as indicated by the arrow in FIG. 3A, intra node multi-cell communications may be used to receive the uplink communications through sector antenna array 117a and transceiver 109a at base station 100, and through sector antenna array 117a and transceiver 109a at base station 100. With rank-1 uplink transmissions, a single uplink transmission stream from wireless terminal 200 is received through both of sectors A and B. With rank-2 uplink transmissions, first and second uplink transmission streams from wireless terminal 200 are received through both of sectors/cells A and B. More particularly, during each transmission time interval of rank-2 uplink transmissions, first and second transport data blocks (of the respective first and second uplink transmission streams) may be transmitted from antenna array 217 using a same time/frequency resource element (TFRE) to increase uplink throughput for the wireless terminal. By receiving both first and second transport data blocks through both sectors when located in the softer handover area, reception thereof may be improved. When wireless terminal 200 is in a border area between two sectors A and B of the same base station 100 as shown in FIG. 3A during rank-2 uplink data transmissions, both data streams from wireless terminal 200 may be processed through a single base station controller 101.

Figure 3B:
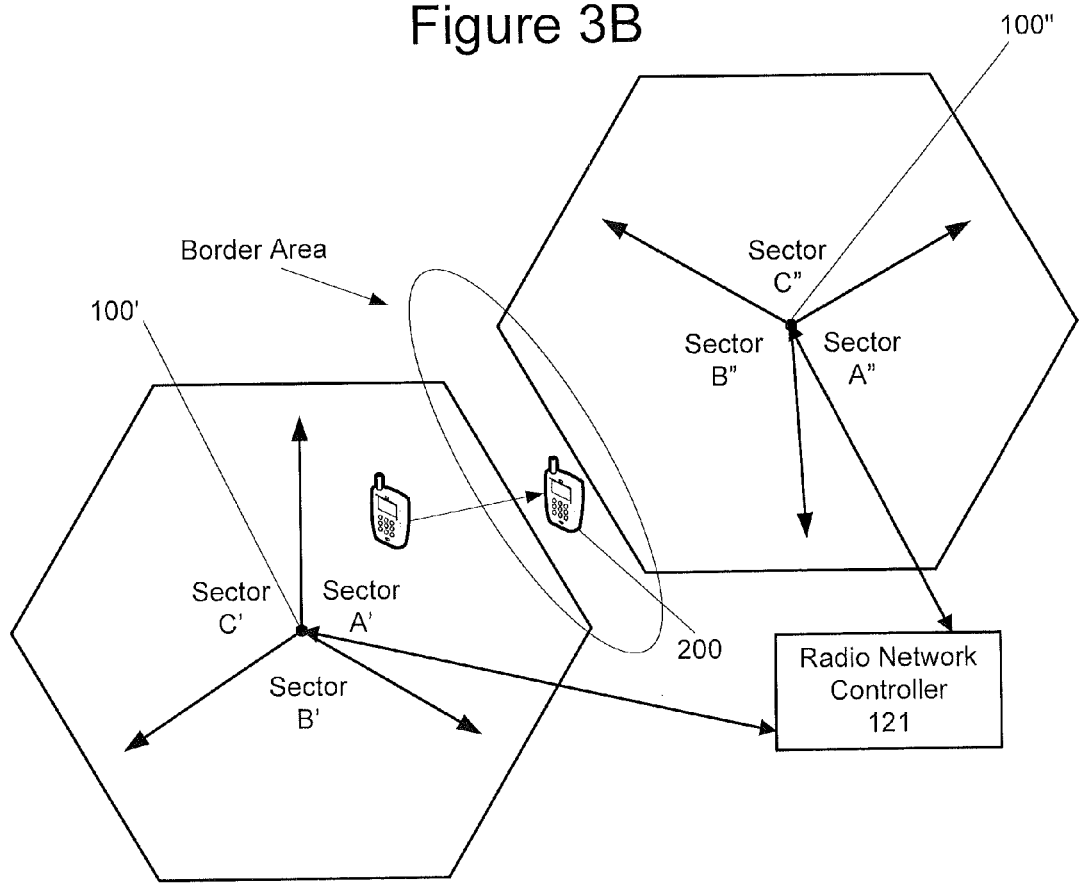

As shown in FIG. 3B, two base stations, identified as base stations 100' and 100", may support communications with wireless terminals, with each of base stations 100' and 100" separately having the structure of FIG. 2A (using prime and double prime notation to separately identify elements of the different base stations 100' and 100"). In addition, each base station 100' and 100" may be coupled to RNC 121. Moreover, base stations 100' may support MIMO communications with wireless terminals located in 120 degree sectors A', B', and C' surrounding base station 100', and base station 100" may support MIMO communications with wireless terminals located in 120 degree sectors A", B", and C" surrounding base station 100". More particularly, transceiver 109a' and sector antenna array 117a' may support MIMO uplink communications with wireless terminals located in Sector A', transceiver 109b' and sector antenna array 117b' may support MIMO uplink communications with wireless terminals located in Sector B', and transceiver 109c' and sector antenna array 117c' may support MIMO uplink communications with wireless terminals located in Sector C'. Similarly, transceiver 109a" and sector antenna array 117a' may support MIMO uplink communications with wireless terminals located in Sector A", transceiver 109b" and sector antenna array 117b"

may support MIMO uplink communications with wireless terminals located in Sector B", and transceiver 109c" and sector antenna array 117c" may support MIMO uplink communications with wireless terminals located in Sector C". When wireless terminal 200 is initially located in a central portion of sector A' as shown in FIG. 3B, RAN 60 may provide wireless uplink communications by receiving rank-1 or rank-2 transmissions from wireless terminal 200 through sector antenna array 117a' and transceiver 109a' using single cell MIMO communications.

When wireless terminal 200 moves from a central portion of sector A' to a border area between sectors A' and B" (of different base stations 100' and 100") as indicated by the arrow in FIG. 3B, RAN 60 may provide multi-cell wireless uplink communications by receiving rank-1 or rank-2 transmissions from wireless terminal 200 through sector antenna array 117a' and transceiver 109a' and through sector antenna array 117b" and transceiver 109b". With rank-1 (single stream) uplink transmissions from wireless terminal 200, the single uplink data stream is received through both sectors A' and B". For each rank-1 transmission time interval (TTI), one transport data block is transmitted by wireless terminal 200 using a TFRE and received through both sectors A' and B". With rank-2 (dual stream) uplink transmissions from wireless terminal 200, first and second uplink data streams are received through both sectors A' and B". For each rank-2 transmission time interval, two transport data blocks are transmitted by wireless terminal 200 using a same TFRE, and both transport data blocks are received through both sectors A' and B".

When wireless terminal 200 is in a border area between two sectors A' and B" of different base stations 100' and 100" as shown in FIG. 3B, all data streams from the wireless terminal 200 may be processed through a single radio network controller (RNC) 121. Diversity combining may thus be performed at radio network controller 121 to provide improved reception from wireless terminal 200.

For a wireless terminal 200 (also referred to as a UE) configured in uplink MIMO mode either single or dual stream transmissions can take place (also referred to as rank-1 and rank-2 transmissions, respectively). For legacy UEs, data or the transport block size (TBS) may be set and controlled via the grant and E-TFC (E-DCH Transport Format Combination, or Enhanced Data Channel Transport Format Combination) selection procedure. The grant is controlled by the network via absolute and relative grants transmitted over the E-AGCH (E-DCH Absolute Grant Channel) and E-RGCH (E-DCH Relative Grant Channel) channels, respectively. The grant is essentially a power measure which allows the radio access network to control the interference that a certain UE is allowed to create. The grant gives the UE an "upper bound" on how much data it may transmit, and the exact number of data bits may depend on power and buffer statuses, and essentially a formula configured via a number of reference values signaled by higher-layers.

For a MIMO capable UE, the E-TFC selection procedure may be extended to cover up to two transport blocks per TTI (Transmission Time Interval) given a current re-transmission status and preferred rank. A bit simplified, one can say that the primary stream E-TFC selection is still controlled via the serving grant, whereas the secondary stream E-TFC selection is controlled by the primary stream transmit power and an offset value (e.g., signalled using a layer 1 signalling channel). In essence, the offset value may be determined by the serving NodeB as a SIR ratio (Signal-to-Interference ratio) between the two streams and an additional compensation factor that may provide/ensure, that a QoS target (e.g. BLER target, or Block Error Rate target) is maintained.

The setting of a secondary stream transport block size for a HSUPA (High Speed Uplink Packet Access) MIMO (Multiple-Input-Multiple-Output) capable wireless terminal 200 (also referred to as a User Equipment node or UE) may be essentially controlled by a primary stream transmit power and an offset value (signaled using a layer 1 signaling channel), where the offset value may be determined by the serving NodeB (also referred to as a radio base station or base station) to meet a QoS (Quality of Service) target. To enhance performance for a HSUPA MIMO capable UE in a soft handover area, it may be beneficial if all involved nodes (radio base stations) can influence this offset value. To achieve this may require some communication between involved nodes and some logics determining an effective offset value. The communication between nodes may either be solved in a proprietary manner via an internal interface or by introducing a new RNC (Radio Network Controller) controlled outer loop (similar to existing outer loop power control) which may require some relatively minor standardization efforts. Embodiments of inventive concepts set forth herein may address issues related to having all nodes influencing an offset value during operation in SHO (Soft of Softer Handover) areas (also referred to as SHO operation).

Current discussions in 3GPP may have focused on a non-handover case, whereas the SHO case may not have been discussed in detail. Accordingly, if soft/softer handover should be supported for rank-2 uplink transmissions, problems discussed above (e.g., how to combine information from different radio access network nodes to form a single offset value for logics and/or signaling) may need to be addressed/solved.

In case of softer handover operation (where uplink transmissions from a wireless terminal are received at different sectors/cells of a same base station as shown in FIG. 3A), there may be no problem, with information sharing between the sectors/cells as all belong to the same NodeB which is the serving NodeB. However, for soft handover operation (wherein uplink transmissions from a wireless terminal are received at sectors/cells of different base stations as shown in FIG. 3B), some communication between the different NodeBs involved in the handover operation may be required and various solutions may be provided. Note that logic used to combine the information from the different cells may need to be addressed both for soft and softer handover operations.

Even though 3GPP agrees not to support rank-2 transmissions during soft handover operation for Rel-11, embodiments discussed herein may be significant/important as future enhancements (e.g. for heterogeneous networks).

According to some embodiments of inventive concepts, alternatives may be provided to convey and/or combine information from different radio access network nodes when deciding an offset value to be used to set the TBS (Transport Block Size) for the secondary stream during soft handover, as well as the rank.

Embodiments of present inventive concepts may provide different alternatives to support/enhance performance for HSUPA MIMO during soft/softer handover operations. Both system/network (e.g., base station or nodeB) and UE (e.g., wireless terminal) performances may be affected. In the following disclosure, a node may also refer to a cell, in particular for softer handover scenarios.

Some alternatives used to convey information according to some embodiments may include (but are not limited to):

1. Only the serving NodeB signals the offset value (according to current agreements). All involved nodes (base stations) will, however, influence the offset value (also referred to as an offset or an offset factor) to ensure that an overall QoS is maintained.

a. In a proprietary manner, all (or a subset) of the nodes (base stations) may signal a respective individual QoS measure. Then the serving NodeB (base station) may combine the individual QoS measures into a single overall compensation factor that is applied to the offset value before being signalled to the UE.

b. The QoS measure of each node (or a subset of nodes) may be gathered in a central place (e.g., at the RNC) where the information is processed into a single compensation factor which is conveyed to the serving NodeB. Such an approach may require some standardization efforts.

2. Let all involved nodes (or a subset of nodes) signal a preferred offset value (e.g., using a layer 1 signalling channel), and let the UE combine the information into a single offset value to be used in the E-TFC selection procedure.

Note that similar mechanisms can be used also to combine and/or influence other information, such as rank and precoding vectors. Note also that Alternative 2 may affect both radio access network and UE implementation/standardization, whereas Alternative 1 may only affect the radio access network.

Logics to combine the information into a single compensation factor may include (but is not limited to):

A. Let one node (base station) decide the compensation factor and ignore the information from other node(s). This may correspond to the legacy behaviour (e.g., for TPC and ACK/NACK feedback, also referred to as Acknowledge/Negative-Acknowledge feedback). The node may be chosen using different criteria (e.g., lowest/highest BLER, lowest/highest throughput, least/highest interference, etc.).

B. Let all the nodes (or a subset of nodes) decide the compensation factor. This can be achieved, for example, by weighting the information from the different nodes. Using different weighting factors, both robust transmission strategies (where more than one node is involved in the data processing) as well as selfish performance strategies (where one or very few nodes are involved in the data processing) may be used/combined.

Note that logic described above may be applicable both in soft and softer handover operations. Further, step B might be more relevant to combine other information (such as rank) in addition to or instead of offset values.

Embodiments disclosed herein may thus support and/or enhance performance for HSUPA MIMO during soft/softer handover operation(s). Both system and UE performances may be affected. More specifically, different alternatives to convey and/or combine information from different nodes when deciding the offset value to be used to set the TBS for the secondary stream during soft handover have been disclosed.

Figure 4A:
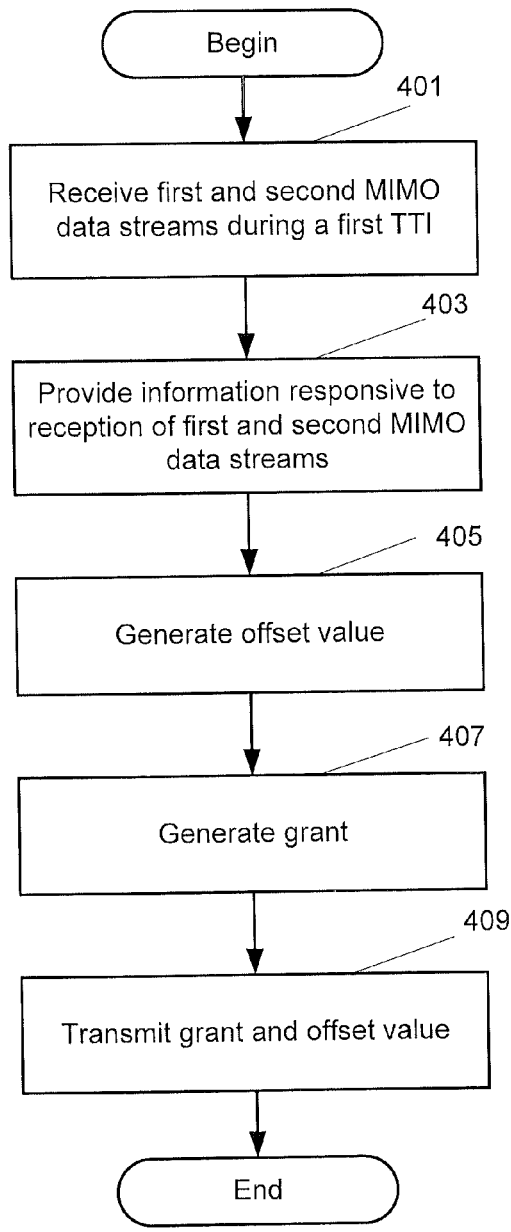
FIGS. 4A, 4B, 5A, 5B, 6A, and 6B are flow charts illustrating operations of radio access network nodes and/or wireless terminals according to some embodiments.

According to some embodiments of present inventive concepts, radio access network 60 may receive two rank-2 data streams through respective first antenna array 117a/117a' of a first sector A/A' and second antenna array 117b/117b" of a second sector B/B", and radio access network 60 may use information (e.g., QoS information) relating to reception through both antenna arrays to generate an offset value for a secondary one of the data streams. As shown in FIG. 4A, first and second multiple-input-multiple-output (MIMO) data streams may be received from the wireless terminal 200 through a first antenna array 117a/117a' of a first sector A/A' for/during a first transmission time interval at block 401, and the first and second MIMO data streams may be received from the wireless terminal 200 through a second antenna array 117b/117b" of a second sector BB" for/during the first transmission time interval at block 401. More particularly, the first and second sectors are different and the first and second antenna arrays may be different.

At block 403, first information may be provided responsive to reception of the first and second MIMO data streams through the first antenna array during the first transmission time interval, and second information may be provided responsive to reception of the first and second MIMO data streams through the second antenna array during the first transmission time interval. For example, the first information may include a first quality of service (QoS) measure, and the second information of reception include a second QoS measure. Moreover, each of the first and second QoS measures may include at least one of an error rate, a block error rate, a signal strength, a signal-to-interference ratio (SIR), and/or a signal-to-interference-plus-noise ratio (SINR).

At block 405, an offset value may be generated responsive to the first information and the second information, with the offset value defining a difference between data rates (e.g., transport block sizes) of the first and second MIMO data streams for a second transmission time interval. Generating the offset value may include generating the offset value responsive to a combination of the first information and the second information. For example, generating the offset value responsive to a combination of the first information and the second information may include generating the offset value responsive to an average of the first information and the second information, responsive to a sum of the first information and the second information, responsive to a weighted average of the first information and the second information, and/or responsive to a weighted sum of the first information and the second information. According to some other embodiments, generating the offset value may include selecting one of the first information or the second information corresponding to a least error rate, a greatest error rate, a least throughput, a greatest throughput, a least interference, a greatest interference, a least signal strength, or a greatest signal strength, and generating the offset value may further include generating the offset value responsive to the selected one of the first information or the second information.

At block 407, a grant may be generated defining a first transport block size of the first MIMO data stream for the second transmission time interval, and the offset value may define a reduction of a second transport block size of the second MIMO data stream relative to the first transport block size for the second transmission time interval. The grant may include a transport format combination for the first MIMO data stream.

At block 409, the grant defining the first transport block size and the offset value may be transmitted to the wireless terminal 200. The offset value, for example, may be transmitted using a layer 1 signaling channel.

At block 401, the first and second antenna arrays 117a and 117b may be co-located as first and second antenna arrays 117a and 117b of a same radio base station 100. If the first and second antenna arrays are co-located as discussed above with respect to FIG. 3A, operations of FIG. 4A may be performed, for example, at processor 141 of base station controller 101. According to some other embodiments, the first and second antenna arrays 117a' and 117b" may be spaced apart at respective spaced apart first and second radio base stations 100' and 100". If the first and second antenna arrays are located at different radio base stations as discussed above with respect to FIG. 3B, operations of FIG. 4A may be performed, for example, at processor 131 of radio network controller 121, or operations of FIG. 4A may be split between and/or shared by processor 131 of radio network controller 121 and one or more base stations 100.

Figure 4B:
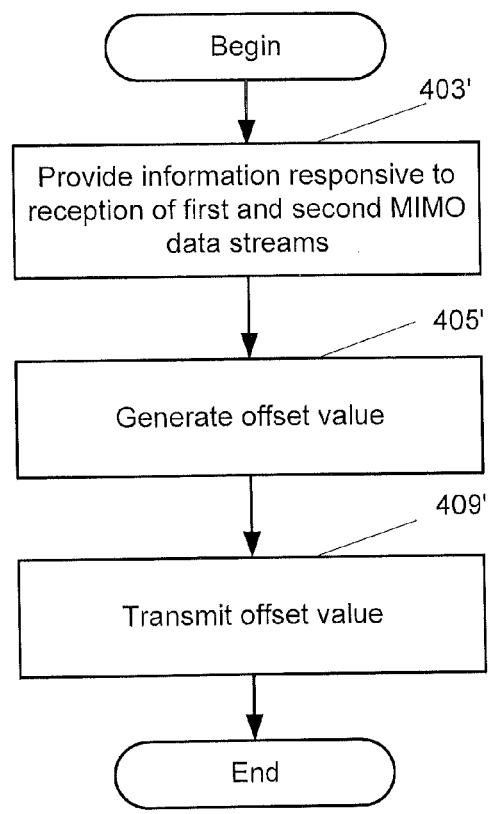

According to some embodiments of present inventive concepts illustrated in FIG. 4B, radio access network 60 may receive two rank-2 data streams through respective first antenna array 117*a*/117*a*' of a first sector A/A' and second antenna array 117*b*/117*b*" of a second sector B/B", and radio access network 60 may use information (e.g., QoS information) relating to reception through both antenna arrays to generate an offset value for a secondary one of the data streams. First and second multiple-input-multiple-output (MIMO) data streams may be received from the wireless terminal 200 through a first antenna array 117*a*/117*a*' of a first sector A/A' for/during a first transmission time interval, and the first and second MIMO data streams may be received from the wireless terminal 200 through a second antenna array 117*b*/117*b*" of a second sector B/B" for/during the first transmission time interval. More particularly, the first and second sectors are different and the first and second antenna arrays may be different.

At block 403', first information may be provided responsive to reception of the first and second MIMO data streams through the first antenna array during the first transmission time interval, and second information may be provided responsive to reception of the first and second MIMO data streams through the second antenna array during the first transmission time interval. For example, the first information may include a first quality of service (QoS) measure, and the second information of reception include a second QoS measure. Moreover, each of the first and second QoS measures may include at least one of an error rate, a block error rate, a signal strength, a signal-to-interference ratio (SIR), and/or a signal-to-interference-plus-noise ratio (SINR).

At block 405', an offset value may be generated responsive to the first information and the second information, with the offset value defining a difference between data rates (e.g., transport block sizes) of the first and second MIMO data streams for a second transmission time interval. Generating the offset value may include generating the offset value responsive to a combination of the first information and the second information. For example, generating the offset value responsive to a combination of the first information and the second information may include generating the offset value responsive to an average of the first information and the second information, responsive to a sum of the first information and the second information, responsive to a weighted average of the first information and the second information, and/or responsive to a weighted sum of the first information and the second information. According to some other embodiments, generating the offset value may include selecting one of the first information or the second information corresponding to a least error rate, a greatest error rate, a least throughput, a greatest throughput, a least interference, a greatest interference, a least signal strength, or a greatest signal strength, and generating the offset value may further include generating the offset value responsive to the selected one of the first information or the second information.

A grant may be generated defining a first transport block size of the first MIMO data stream for the second transmission time interval, and the offset value may define a reduction of a second transport block size of the second MIMO data stream relative to the first transport block size for the second transmission time interval. The grant may include a transport format combination for the first MIMO data stream.

At block 409', the grant defining the first transport block size and the offset value may be transmitted to the wireless terminal 200. The offset value, for example, may be transmitted using a layer 1 signaling channel.

As discussed above, the first and second antenna arrays 117*a* and 117*b* may be co-located as first and second antenna arrays 117*a* and 117*b* of a same radio base station 100. If the first and second antenna arrays are co-located as discussed above with respect to FIG. 3A, operations of FIG. 4B may be performed, for example, at processor 141 of base station controller 101. According to some other embodiments, the first and second antenna arrays 117*a*' and 117*b*" may be spaced apart at respective spaced apart first and second radio base stations 100' and 100". If the first and second antenna arrays are located at different radio base stations as discussed above with respect to FIG. 3B, operations of FIG. 4B may be performed, for example, at processor 131 of radio network controller 121, or operations of FIG. 4B may be split between and/or shared by processor 131 of radio network controller 121 and one or more base stations 100.

Figure 5A:
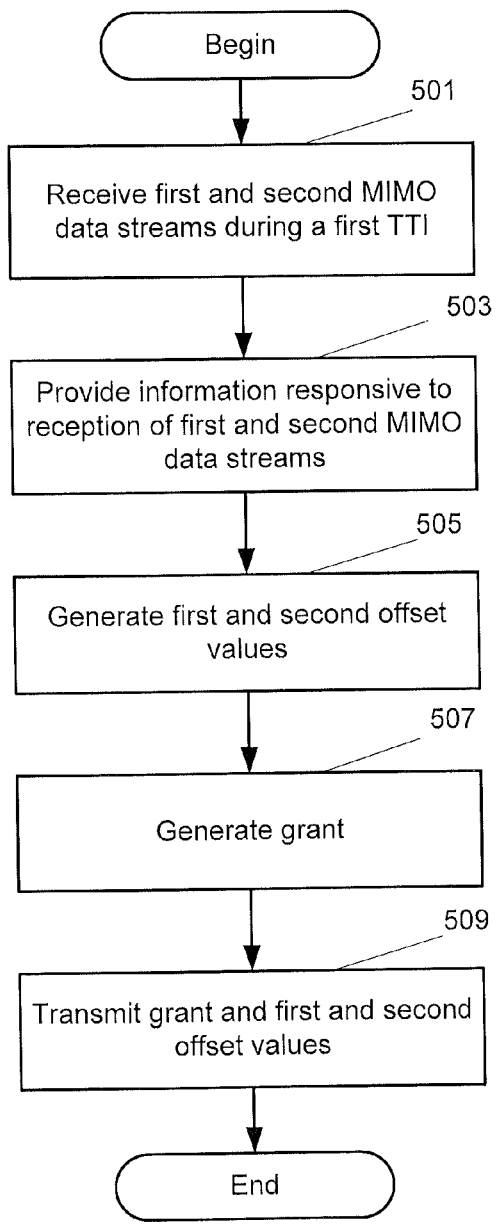

According to some other embodiments of present inventive concepts illustrated in FIG. 5A, first and second multiple-input-multiple-output (MIMO) data streams may be received from wireless terminal 200 through a first antenna array 117*a*/117*a*' of a first sector A/A' for/during a first transmission time interval at block 501, and first and second MIMO data streams may be received from the wireless terminal 200 through a second antenna array 117*b*/117*b*" of a second sector B/B" for/during the first transmission time interval at block 501. More particularly, the first and second sectors may be different and the first and second antenna arrays may be different.

At block 503, first information may be provided responsive to reception of the first and second MIMO data streams through the first antenna array during the first transmission time interval, and second information may be provided responsive to reception of the first and second MIMO data streams through the second antenna array during the first transmission time interval. For example, the first information may include a first quality of service (QoS) measure, and the second information of reception include a second QoS measure. Moreover, each of the first and second QoS measures may include at least one of an error rate, a block error rate, a signal strength, a signal-to-interference ratio (SIR), and/or a signal-to-interference-plus-noise ratio (SINR).

At block 505, a first offset value may be generated responsive to the first information, with the first offset value defining a first difference between data rates of the first and second MIMO data streams for a second transmission time interval after the first transmission time interval. Also at block 505, a second offset value may be generated responsive to the second information, with the second offset value defines a second difference between data rates of the first and second MIMO data streams for the second transmission time interval.

At block 507, a grant may be generated defining a first transport block size of the first MIMO data stream for the second transmission time interval, with the first and second offset values defining respective first and second reductions of a second transport block size of the second MIMO data stream relative to the first transport block size for the second transmission time interval. The grant may include a transport format combination for the first MIMO data stream. At block 509, the grant defining the first transport block size and the first and second offset values may be transmitted to the wireless terminal 200. For example, the grant and the first offset value may be transmitted to the wireless terminal through the first antenna array, and the second offset value may be transmitted through the second antenna array. More particularly, the first offset value may be transmitted using a first layer 1 signaling channel between the first antenna array and the wireless terminal, and the second offset value may be transmitted using a second layer 1 signaling channel between the second antenna array and the wireless terminal.

At block 501, the first and second antenna arrays 117*a* and 117*b* may be co-located as first and second antenna arrays 117*a* and 117*b* of a same radio base station 100. If the first and second antenna arrays are co-located as discussed above with respect to FIG. 3A, operations of FIG. 5A may be performed, for example, at processor 141 of base station controller 101. According to some other embodiments, the first and second antenna arrays 117*a*' and 117*b*" may spaced apart at respective spaced apart first and second radio base stations 100' and 100". If the first and second antenna arrays are located at different radio base stations as discussed above with respect to FIG. 3B, operations of FIG. 5A may be performed, for example, at processor 131 of radio network controller 121, or operations of FIG. 5A may be split between and/or shared by processor 131 of radio network controller 121 and one or more base stations 100.

Figure 6A:
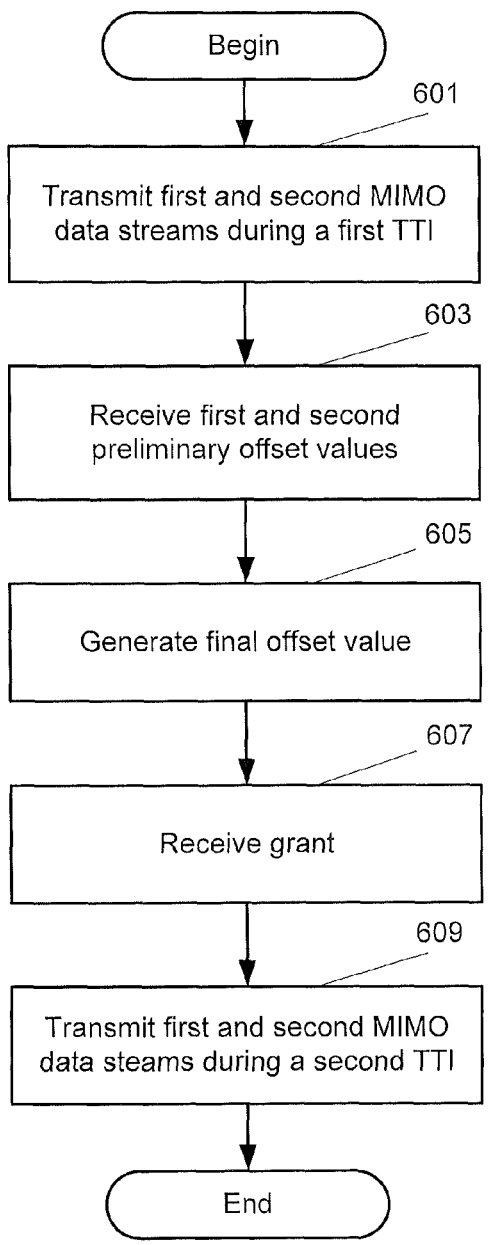

According to embodiments of FIG. 5A, corresponding operations of FIG. 6A may be performed at wireless terminal 200 (e.g., at wireless terminal processor 201). At block 601, the first and second multiple-input-multiple-output (MIMO) data streams may be transmitted from wireless terminal 200 to the radio access network 60 for/during the first transmission time interval (e.g., the data streams of block 501).

At block 603, a first preliminary offset value (e.g., the first offset value of block 509) defining a first difference between data rates (e.g., transport block sizes) of the first and second MIMO data streams may be received, and a second preliminary offset value (e.g., the second offset value of block 509) defining a second difference between data rates (e.g., transport block sizes) of the first and second MIMO data streams may be received. Receiving the first preliminary offset value may include receiving the first preliminary offset value over a first layer 1 signaling channel between the wireless terminal (200) and a first antenna array 117*a*/117*a*' of a first sector A/A', and receiving the second preliminary offset value may include receiving the second preliminary offset value over a second layer 1 signaling channel between the wireless terminal 200 and a second antenna array 117*b*/117*b*" of a second sector B/B".

At block 605, a final offset value may be generated responsive to the first and second preliminary offset values with the final offset value defining a difference between data rates of the first and second MIMO data streams for a second transmission time interval after the first transmission time interval. Generating the final offset value may include generating the final offset value responsive to a combination of the first preliminary offset value and the second preliminary offset value. For example, generating the final offset value may include generating the final offset value responsive to an average of the first and second preliminary offset values, responsive to a sum of the first and second preliminary offset values, responsive to a weighted average of the first and second preliminary offset values, and/or responsive to a weighted sum of the first and second preliminary offset values. According to some other embodiments, generating the final offset value may further include selecting one of the first and second preliminary offset values corresponding to a least error rate, a greatest error rate, a least throughput, a greatest throughput, a least interference, a greatest interference, a least signal strength, or a greatest signal strength.

At block 607, a grant defining a first transport block size of the first MIMO data stream for the second transmission time interval may be received, with the final offset value defining a reduction of a second transport block size of the second MIMO data stream relative to the first transport block size for the second transmission time interval. The grant may include a transport format combination for the first MIMO data stream.

At block 609, the first and second MIMO data streams may be transmitted from the wireless terminal to the radio access network during the second transmission time interval using the final offset value to define the difference between data rates of the first and second MIMO data streams. More particularly, the first MIMO data stream may be transmitted in accordance with first transport block size and the second MIMO data stream may be transmitted in accordance with the final offset value.

Figure 5B:
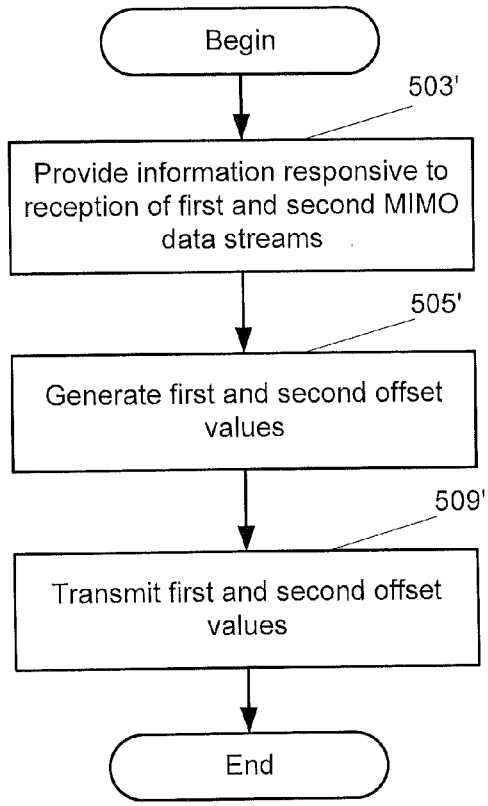

According to some other embodiments of present inventive concepts illustrated in FIG. 5B, first and second multiple-input-multiple-output (MIMO) data streams may be received from wireless terminal 200 through a first antenna array 117*a*/117*a*' of a first sector A/A' for/during a first transmission time interval, and first and second MIMO data streams may be received from the wireless terminal 200 through a second antenna array 117*b*/117*b*" of a second sector B/B" for/during the first transmission time interval. More particularly, the first and second sectors may be different and the first and second antenna arrays may be different.

At block 503', first information may be provided responsive to reception of the first and second MIMO data streams through the first antenna array during the first transmission time interval, and second information may be provided responsive to reception of the first and second MIMO data streams through the second antenna array during the first transmission time interval. For example, the first information may include a first quality of service (QoS) measure, and the second information of reception include a second QoS measure. Moreover, each of the first and second QoS measures may include at least one of an error rate, a block error rate, a signal strength, a signal-to-interference ratio (SIR), and/or a signal-to-interference-plus-noise ratio (SINR).

At block 505', a first offset value may be generated responsive to the first information, with the first offset value defining a first difference between data rates of the first and second MIMO data streams for a second transmission time interval after the first transmission time interval. Also at block 505', a second offset value may be generated responsive to the second information, with the second offset value defines a second difference between data rates of the first and second MIMO data streams for the second transmission time interval.

A grant may be generated defining a first transport block size of the first MIMO data stream for the second transmission time interval, with the first and second offset values defining respective first and second reductions of a second transport block size of the second MIMO data stream relative to the first transport block size for the second transmission time interval. The grant may include a transport format combination for the first MIMO data stream. At block 509', the grant defining the first transport block size and the first and second offset values may be transmitted to the wireless terminal 200. For example, the grant and the first offset value may be transmitted to the wireless terminal through the first antenna array, and the second offset value may be transmitted through the second antenna array. More particularly, the first offset value may be transmitted using a first layer 1 signaling channel between the first antenna array and the wireless terminal, and the second offset value may be transmitted using a second layer 1 signaling channel between the second antenna array and the wireless terminal.

The first and second antenna arrays 117a and 117b may be co-located as first and second antenna arrays 117a and 117b of a same radio base station 100. If the first and second antenna arrays are co-located as discussed above with respect to FIG. 3A, operations of FIG. 5B may be performed, for example, at processor 141 of base station controller 101. According to some other embodiments, the first and second antenna arrays 117a' and 117b" may spaced apart at respective spaced apart first and second radio base stations 100' and 100". If the first and second antenna arrays are located at different radio base stations as discussed above with respect to FIG. 3B, operations of FIG. 5B may be performed, for example, at processor 131 of radio network controller 121, or operations of FIG. 5B may be split between and/or shared by processor 131 of radio network controller 121 and one or more base stations 100.

Figure 6B:
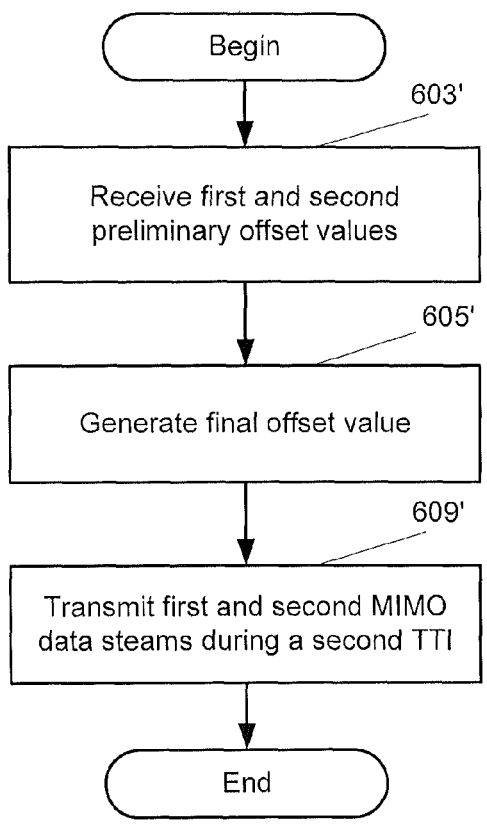

According to embodiments of FIG. 5B, corresponding operations of FIG. 6B may be performed at wireless terminal 200 (e.g., at wireless terminal processor 201). The first and second multiple-input-multiple-output (MIMO) data streams may be transmitted from wireless terminal 200 to the radio access network 60 for/during the first transmission time interval.

At block 603', a first preliminary offset value (e.g., the first offset value of block 509) defining a first difference between data rates (e.g., transport block sizes) of the first and second MIMO data streams may be received, and a second preliminary offset value (e.g., the second offset value of block 509') defining a second difference between data rates (e.g., transport block sizes) of the first and second MIMO data streams may be received. Receiving the first preliminary offset value may include receiving the first preliminary offset value over a first layer 1 signaling channel between the wireless terminal 200 and a first antenna array 117a/117a' of a first sector A/A', and receiving the second preliminary offset value may include receiving the second preliminary offset value over a second layer 1 signaling channel between the wireless terminal 200 and a second antenna array 117b/117b" of a second sector B/B".

At block 605', a final offset value may be generated responsive to the first and second preliminary offset values with the final offset value defining a difference between data rates of the first and second MIMO data streams for a second transmission time interval after the first transmission time interval. Generating the final offset value may include generating the final offset value responsive to a combination of the first preliminary offset value and the second preliminary offset value. For example, generating the final offset value may include generating the final offset value responsive to an average of the first and second preliminary offset values, responsive to a sum of the first and second preliminary offset values, responsive to a weighted average of the first and second preliminary offset values, and/or responsive to a weighted sum of the first and second preliminary offset values. According to some other embodiments, generating the final offset value may further include selecting one of the first and second preliminary offset values corresponding to a least error rate, a greatest error rate, a least throughput, a greatest throughput, a least interference, a greatest interference, a least signal strength, or a greatest signal strength.

A grant defining a first transport block size of the first MIMO data stream for the second transmission time interval may be received, with the final offset value defining a reduction of a second transport block size of the second MIMO data stream relative to the first transport block size for the second transmission time interval. The grant may include a transport format combination for the first MIMO data stream.

At block 609', the first and second MIMO data streams may be transmitted from the wireless terminal to the radio access network during the second transmission time interval using the final offset value to define the difference between data rates of the first and second MIMO data streams. More particularly, the first MIMO data stream may be transmitted in accordance with first transport block size and the second MIMO data stream may be transmitted in accordance with the final offset value.

ABBREVIATIONS

3GPP 3rd Generation Partnership Project
ACK Positive Acknowledgement
BLER Block Error Rate
E-AGCH E-DCH Absolute Grant Channel
E-DCH Enhanced Dedicated Channel
E-RGCH E-DCH Relative Grant Channel
E-TFC E-DCH Transport Format Combination
HSUPA High Speed Uplink Packet Access
MIMO Multiple Input Multiple Output
NACK Negative Acknowledgement
QoS Quality of Service
RNC Radio Network Controller
SHO Soft or Softer Handover
TBS Transport Block Size
TPC Transmission Power Control
UE User Equipment

EXAMPLES OF EMBODIMENTS

Embodiment 1

A method of communicating with a wireless terminal (200), the method comprising: receiving (401) first and second multiple-input-multiple-output, MIMO, data streams from the wireless terminal (200) through a first antenna array (117a, 117a') of a first sector (A, A') during a first transmission time interval; receiving (401) the first and second MIMO data streams from the wireless terminal (200) through a second antenna array (117b, 117b") of a second sector (B, B") during the first transmission time interval, wherein the first and second sectors are different and the first and second antenna arrays are different; providing (403) first information responsive to reception of the first and second MIMO data streams through the first antenna array during the first transmission time interval; providing (403) second information responsive to reception of the first and second MIMO data streams through the second antenna array during the first transmission time interval; generating (405) an offset value responsive to the first information and the second information, wherein the offset value defines a difference between data rates of the first and second MIMO data streams for a second transmission time interval; and transmitting (409) the offset value to the wireless terminal (200).

Embodiment 2

The method of embodiment 1 further comprising: generating (407) a grant defining a first transport block size of the first MIMO data stream for the second transmission time interval, wherein the offset value defines a reduction of a second transport block size of the second MIMO data stream relative to the first transport block size for the second transmission time interval; and transmitting (409) the grant defining the first transport block size to the wireless terminal (200).

Embodiment 3

The method of embodiment 2 wherein the grant includes a transport format combination for the first MIMO data stream.

Embodiment 4

The method of any one of embodiments 1-3 wherein transmitting the offset value comprises transmitting the offset value using a layer 1 signaling channel.

Embodiment 5

The method of any one of embodiments 1-4 wherein the first information comprises a first quality of service, QoS, measure and wherein the second information comprises a second QoS measure.

Embodiment 6

The method of embodiment 5 wherein each of the first and second QoS measures comprises at least one of an error rate, a block error rate, a signal strength, a signal-to-interference ratio (SIR), and/or a signal-to-interference-plus-noise ratio (SINR).

Embodiment 7

The method of any one of embodiments 1-6 wherein generating the offset value comprises generating the offset value responsive to a combination of the first information and the second information.

Embodiment 8

The method of embodiment 7 wherein generating the offset value responsive to a combination of the first information and the second information comprises generating the offset value responsive to an average of the first information and the second information, responsive to a sum of the first information and the second information, responsive to a weighted average of the first information and the second information, and/or responsive to a weighted sum of the first information and the second information.

Embodiment 9

The method of any one of embodiments 1-6 wherein generating the offset value further comprises, selecting one of the first information or the second information corresponding to a least error rate, a greatest error rate, a least throughput, a greatest throughput, a least interference, a greatest interference, a least signal strength, or a greatest signal strength, and wherein generating the offset value further comprises generating the offset value responsive to the selected one of the first information or the second information.

Embodiment 10

The method of any of embodiments 1-9 wherein the first and second antenna arrays (117a and 117b) are co-located as first and second antenna arrays (117a and 117b) of a radio base station (100).

Embodiment 11

The method of any of embodiments 1-9 wherein the first and second antenna arrays (117a' and 117b") are spaced apart at respective spaced apart first and second radio base stations (100' and 100").

Embodiment 12

A method of communicating with a wireless terminal (200), the method comprising: receiving (501) first and second multiple-input-multiple-output, MIMO, data streams from the wireless terminal (200) through a first antenna array (117a, 117a') of a first sector (A, A') during a first transmission time interval; receiving (501) the first and second MIMO data streams from the wireless terminal (200) through a second antenna array (117b, 117b') of a second sector (B, B') during the first transmission time interval, wherein the first and second sectors are different and the first and second antenna arrays are different; providing (503) first information responsive to reception of the first and second MIMO data streams through the first antenna array during the first transmission time interval; providing (503) second information responsive to reception of the first and second MIMO data streams through the second antenna array during the first transmission time interval; generating (505) a first offset value responsive to the first information, wherein the first offset value defines a first difference between data rates of the first and second MIMO data streams for a second transmission time interval after the first transmission time interval; generating (505) a second offset value responsive to the second information, wherein the second offset value defines a second difference between data rates of the first and second MIMO data streams for the second transmission time interval; and transmitting (509) the first and second offset values to the wireless terminal (200).

Embodiment 13

The method of embodiment 12 further comprising: generating (507) a grant defining a first transport block size of the first MIMO data stream for the second transmission time interval, wherein the first and second offset values define respective first and second reductions of a second transport block size of the second MIMO data stream relative to the first transport block size for the second transmission time interval; and transmitting (509) the grant defining the first transport block size to the wireless terminal (200).

Embodiment 14

The method of embodiment 13 wherein the grant includes a transport format combination for the first MIMO data stream.

Embodiment 15

The method of any one of embodiments 12-14 wherein the first information comprises a first quality of service, QoS, measure and wherein the second information comprises a second QoS measure.

Embodiment 16

The method of embodiment 15 wherein each of the first and second QoS measures comprises at least one of an error rate, a block error rate, a signal strength, a signal-to-interference ratio (SIR), and/or a signal-to-interference-plus-noise ratio (SINR).

Embodiment 17

The method of any of embodiments 12-16 wherein the first and second antenna arrays (117a and 117b) are co-located as first and second antenna arrays (117a and 117b) of a radio base station (100).

Embodiment 18

The method of any of embodiments 12-16 wherein the first and second antenna arrays (117a' and 117b") are spaced apart at respective spaced apart first and second radio base stations (100' and 100").

Embodiment 19

A method of communicating with a radio access network (60), the method comprising: transmitting (601) first and second multiple-input-multiple-output, MIMO, data streams from a wireless terminal (200) to the radio access network (60) during a first transmission time interval; receiving (603) a first preliminary offset value defining a first difference between data rates of the first and second MIMO data streams; receiving (603) a second preliminary offset value defining a second difference between data rates of the first and second MIMO data streams; generating (605) a final offset value responsive to the first and second preliminary offset values wherein the final offset value defines a difference between data rates of the first and second MIMO data streams for a second transmission time interval after the first transmission time interval; and transmitting (609) the first and second MIMO data streams from the wireless terminal (200) to the radio access network during the second transmission time interval using the final offset value to define the difference between data rates of the first and second MIMO data streams.

Embodiment 20

The method of embodiment 19 further comprising: receiving (607) a grant defining a first transport block size of the first MIMO data stream for the second transmission time interval, wherein the final offset value defines a reduction of a second transport block size of the second MIMO data stream relative to the first transport block size for the second transmission time interval; wherein transmitting the first and second MIMO data streams during the second transmission time interval comprises transmitting the first MIMO data stream in accordance with first transport block size and transmitting the second MIMO data stream in accordance with the final offset value.

Embodiment 21

The method of embodiment 20 wherein the grant includes a transport format combination for the first MIMO data stream.

Embodiment 22

The method of any of embodiments 19-21 wherein receiving the first preliminary offset value comprises receiving the first preliminary offset value over a first signaling channel between the wireless terminal (200) and a first antenna array (117a, 117a') of a first sector (A, A'), and wherein receiving the second preliminary offset value comprises receiving the second preliminary offset value over a second signaling channel between the wireless terminal (200) and a second antenna array (117b, 117b") of a second sector (B, B").

Embodiment 23

The method of any of embodiments 19-22 wherein generating the final offset value comprises generating the final offset value responsive to a combination of the first preliminary offset value and the second preliminary offset value.

Embodiment 24

The method of embodiment 23 wherein generating the final offset value comprises generating the final offset value responsive to an average of the first and second preliminary offset values, responsive to a sum of the first and second preliminary offset values, responsive to a weighted average of the first and second preliminary offset values, and/or responsive to a weighted sum of the first and second preliminary offset values.

Embodiment 25

The method of any one of embodiments 19-22 wherein generating the final offset value further comprises, selecting one of the first and second preliminary offset values corresponding to a least error rate, a greatest error rate, a least throughput, a greatest throughput, a least interference, a greatest interference, a least signal strength, or a greatest signal strength.

Further Definitions.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and, is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of present inventive concepts. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts.

That which is claimed is:

1. A method of communicating with a wireless terminal, the method comprising:

providing first information responsive to receiving first and second multiple-input-multiple-output (MIMO) data streams from the wireless terminal through a first antenna array of a first sector during a first transmission time interval;

providing second information responsive to receiving the first and second MIMO data streams from the wireless terminal through a second antenna array of a second sector during the first transmission time interval, wherein the first and second sectors are different and the first and second antenna arrays are different;

generating an offset value responsive to the first information and the second information, wherein the offset value defines a difference between the first and second MIMO data streams for a second transmission time interval; and transmitting the offset value to the wireless terminal, wherein generating the offset value comprises generating a first offset value responsive to the first information and generating a second offset value responsive to the second information, wherein the first offset value defines a first difference between data rates of the first and second MIMO data streams for the second transmission time interval after the first transmission time interval, wherein the second offset value defines a second difference between data rates of the first and second MIMO data streams for the second transmission time interval, and wherein transmitting the offset value comprises transmitting the first and second offset values to the wireless terminal.

2. The method of claim 1 wherein the offset value defines a difference between data rates of the first and second MIMO data streams for the second transmission time interval.

3. The method of claim 2 further comprising:

generating a grant defining a first transport block size of the first MIMO data stream for the second transmission time interval, wherein the offset value defines a reduction of a second transport block size of the second MIMO data stream relative to the first transport block size for the second transmission time interval; and transmitting the grant defining the first transport block size to the wireless terminal.

4. The method of claim 3 wherein the grant includes a transport format combination for the first MIMO data stream.

5. The method of claim 1, wherein transmitting the offset value comprises transmitting the offset value using a layer 1 signaling channel.

6. The method of claim 1, wherein the first information comprises a first quality of service (QoS) measure and wherein the second information comprises a second QoS measure.

7. The method of claim 6 wherein each of the first and second QoS measures comprises at least one of an error rate, a block error rate, a signal strength, a signal-to-interference ratio, SIR, and/or a signal-to-interference-plus-noise ratio (SINR).

8. The method of claim 1 further comprising:

generating a grant defining a first transport block size of the first MIMO data stream for the second transmission time interval, wherein the first and second offset values define respective first and second reductions of a second transport block size of the second MIMO data stream relative to the first transport block size for the second transmission time interval; and transmitting the grant defining the first transport block size to the wireless terminal.

9. The method of claim 1, wherein the first and second antenna arrays are co-located as first and second antenna arrays of a radio base station.

10. The method of claim 1, wherein the first and second antenna arrays are spaced apart at respective spaced apart first and second radio base stations.

11. The method of claim 1, wherein generating the offset value comprises generating the offset value responsive to the first information and the second information.

12. A radio network controller of a radio access network, the radio network controller comprising:

a network interface configured to provide communications with first and second base stations including respective first and second antenna arrays of respective first and second sectors; and a processor coupled with the network interface wherein the processor is configured to, provide first information responsive to receiving first and second multiple-input-multiple-output (MIMO) data streams from a wireless terminal through the first antenna array of the first sector during a first transmission time interval, provide second information responsive to receiving the first and second MIMO data streams from the wireless terminal through the second antenna array of the second sector during the first transmission time interval, generate an offset value responsive to the first information and the second information, wherein the offset value defines a difference between the first and second MIMO data streams for a second transmission time interval, and transmit the offset value through the network interface to the wireless terminal, wherein the offset value is generated by generating a first offset value responsive to the first information and generating a second offset value responsive to the second information, wherein the first offset value defines a first difference between data rates of the first and second MIMO data streams for the second transmission time interval after the first transmission time interval, wherein the second offset value defines a second difference between data rates of the first and second MIMO data streams for the second transmission time interval, and wherein the offset value is transmitted by transmitting the first and second offset values to the wireless terminal.

13. The radio network controller of claim 12 wherein the offset value defines a difference between data rates of the first and second MIMO data streams for the second transmission time interval.

14. The radio network controller of claim 13 wherein the processor is further configured to, generate a grant defining a first transport block size of the first MIMO data stream for the second transmission time interval, wherein the offset value defines a reduction of a second transport block size of the second MIMO data stream relative to the first transport block size for the second transmission time interval, and transmit the grant defining the first transport block size through the network interface to the wireless terminal.

15. The radio network controller of claim 14 wherein the grant includes a transport format combination for the first MIMO data stream.

16. The radio network controller of claim 12, wherein the processor is configured to transmit the offset value using a layer 1 signaling channel.

17. The radio network controller of claim 12, wherein the first information comprises a first quality of service (QoS) measure and wherein the second information comprises a second QoS measure.

18. The radio network controller of claim 12, wherein the processor is configured to generate the offset value responsive to the first information and the second information.

19. A system for communication between a radio network controller of a radio access network and a wireless terminal, the system comprising:

the wireless terminal comprising:
- a transceiver configured to provide communications with the radio access network over a wireless channel; and
- a first processor coupled to the transceiver, wherein the first processor is configured to:
- transmit first and second multiple-input-multiple-output (MIMO) data streams through the transceiver during a first transmission time interval,
- receive a first offset value defining a first difference between the first and second MIMO data streams,
- receive a second offset value defining a second difference between the first and second MIMO data streams,
- generate a final offset value responsive to the first and second offset values, wherein the final offset value defines a difference between the first and second MIMO data streams for a second transmission time interval after the first transmission time interval, and
- transmit the first and second MIMO data streams through the transceiver to the radio access network during the second transmission time interval using the final offset value to define the difference between the first and second MIMO data streams; and the radio network controller comprising:
- a network interface configured to provide communications with first and second base stations including respective first and second antenna arrays of respective first and second sectors; and
- a second processor coupled with the network interface, wherein the second processor is configured to:
- provide first information responsive to receiving the first and second MIMO data streams from the wireless terminal through the first antenna array of the first sector during the first transmission time interval,
- provide second information responsive to receiving the first and second MIMO data streams from the wireless terminal through the second antenna array of the second sector during the first transmission time interval,
- generate the first offset value responsive to the first information and generate the second offset value responsive to the second information, wherein the first offset value defines the first difference between data rates of the first and second MIMO data streams for the second transmission time interval after the first transmission time interval, wherein the second offset value defines the second difference between data rates of the first and second MIMO data streams for the second transmission time interval, and
- transmit the first and second offset values through the network interface to the wireless terminal.

* * * * *